O. B. ELKINS.
COTTON STALK PULLER.
APPLICATION FILED MAR. 9, 1916.
1,205,721.
Patented Nov. 21, 1916.
2 SHEETS—SHEET 1.
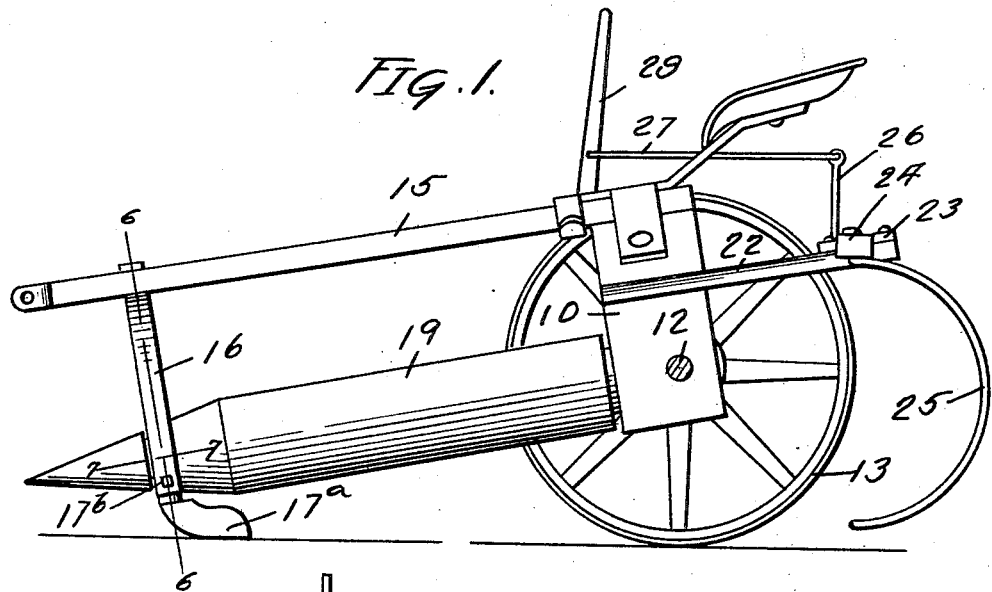
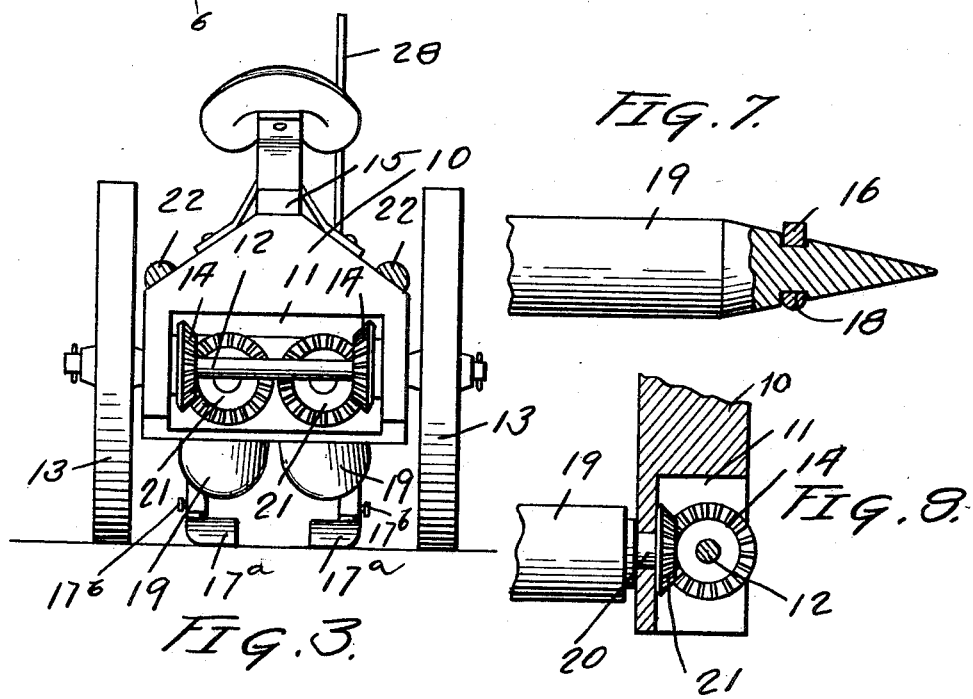
Witnesses
B. E. Brann
Henry T. Bright
Inventor
O. B. Elkins
By
Attorneys

O. B. ELKINS.
COTTON STALK PULLER.
APPLICATION FILED MAR. 9, 1916.

1,205,721.

Patented Nov. 21, 1916.
2 SHEETS—SHEET 2.

Witnesses
Inventor
O. B. Elkins
By
Attorneys

UNITED STATES PATENT OFFICE.

OTTO B. ELKINS, OF NEAR ABBEVILLE, GEORGIA.

COTTON-STALK PULLER.

1,205,721.　　　　　Specification of Letters Patent.　　Patented Nov. 21, 1916.

Application filed March 9, 1916. Serial No. 83,118.

*To all whom it may concern:*

Be it known that I, OTTO B. ELKINS, a citizen of the United States, residing near Abbeville, in the county of Wilcox, State of Georgia, have invented certain new and useful Improvements in Cotton-Stalk Pullers; and I do hereby declare the following to be a full, clear, and exact description of the invention, such as will enable others skilled in the art to which it appertains to make and use the same.

This invention relates to cotton stalk pullers.

The object of the invention is to provide a machine of the character named which will be simple in construction, efficient in use, and which can be manufactured at an exceedingly small cost.

A further object of the invention is to provide a machine of the type named which will enable the pulled stalks to be raked into piles for burning as the machine moves over the ground.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 2:
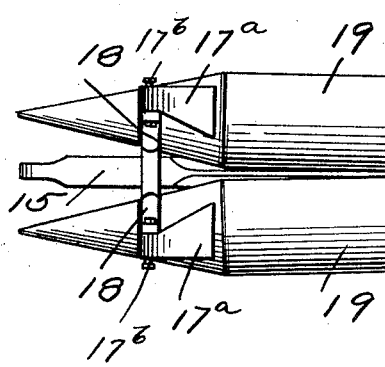
Figure 4:
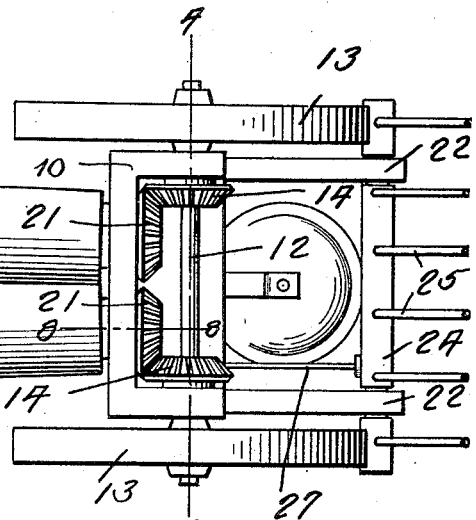
Figure 5:
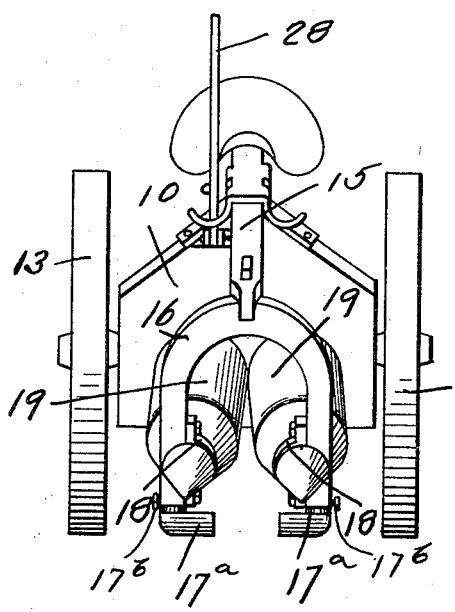
Figure 6:
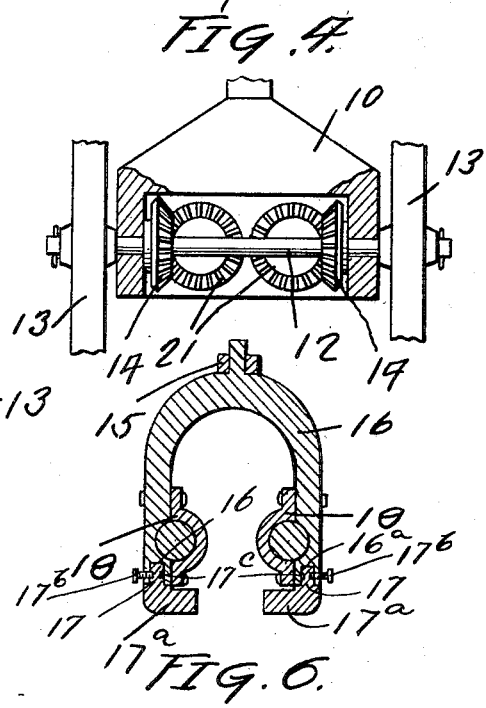

Figure 1 is a side view of the invention with the near wheel removed; Fig. 2, a bottom view of same; Fig. 3, a rear view with the rake element detached; Fig. 4, a section on the line 4—4 of Fig. 2; Fig. 5, a front view of the machine; Fig. 6, a section on the line 6—6 of Fig. 1; Fig. 7, a section on the line 7—7 of Fig. 1; and Fig. 8, a section on the line 8—8 of Fig. 2.

Referring to the drawings the improved stalk puller is shown as comprising a body 10 provided with a recess 11 which opens through the rear and bottom faces of the body. Rotatably mounted in the body 10 and extending through the recess 11 is an axle 12 which has fixed on the ends thereof respectively traction wheels 13. Fixed on the axle 12 within the recess 11 are oppositely disposed beveled gears 14 for a purpose that will presently appear. Secured to the top of the body 10 and extending forwardly is a bar 15 which carries adjacent its forward end a depending U-shaped member 16 the lower ends of the arms of which are provided with recesses $16^a$ respectively in which are rotatably adjustable the stems 17 of runners $17^a$. A binding screw $17^b$ is mounted in each arm of the member 16 and projects into a circumscribing groove $17^c$ on the related stem 17. By manipulating the screws $17^b$ the runners $17^a$ can be secured in any desired rotative adjustment, while the engagement of the screws $17^b$ in the related groove $17^c$ will prevent the runners from being disengaged from the member 16. Secured to the inner sides of respective arms of the U-shaped member 16 are bearings 18 which rotatably support the forward ends of respective rollers 19, said forward ends of the rollers 19 being tapered so as to guide the stalks between the rollers to be gripped thereby. The rear ends of the rollers 19 terminate respectively in trunnions 20 which are rotatably engaged in the body 10 and project into the recess 11. Fixed on the trunnions 20 respectively are beveled gears 21 which mesh respectively with the beveled gears 14 so that rotation of the axle 12 will impart the necessary pulling rotation to the rollers 19 as will be obvious. Carried by the body 10 are rearwardly extending arms 22 provided at their free ends with bearings 23 in which is rotatably mounted a rake head 24 carrying rake teeth 25. Mounted upon the head 24 is an arm 26 which is connected by link 27 to an operating lever 28, the latter being pivotally mounted upon the body 10. Mounted upon the bar 15 and body 10 is an operator's seat 29.

In the use of the machine it will be obvious that as same is moved along the ground the stalks will pass between the rollers 19 and pull from the ground by the operation thereof. The pulled stalks will then be gathered by the rake teeth 25 and when a suitable quantity is held by the teeth the latter are lifted by the operation of the lever 28 to release the stalks in a pile. The rake is then released to its normal position and the operation just described repeated.

What is claimed is:—

In a stalk pulling machine the combination of a body provided with a recess opening through the rear and bottom faces of the body, an axle rotatably mounted in the body and extending through said recess, traction wheels fixed on the axle, a pair of gears fixed on the axle within the recess, a bar secured to the body and extending forwardly thereof, a U-shaped member depending from said bar, runners rotatably adjustable on the lower ends of the arms of said member, coöperating rollers rotatably supported at their forward ends by said arms, trunnions on the rear ends of said rollers rotatably engaged in the body and extending into said recess, and gears fixed on said trunnions meshing respectively with the gears on the axle.

In testimony whereof, I affix my signature, in the presence of two witnesses.

OTTO B. ELKINS.

Witnesses:
 HAL LAWSON,
 W. G. DYER.

Copies of this patent may be obtained for five cents each, by addressing the "Commissioner of Patents, Washington, D. C."